(12) United States Patent
White et al.

(10) Patent No.: US 7,146,326 B1
(45) Date of Patent: Dec. 5, 2006

(54) SYSTEM AND METHOD FOR OUTSIDE PLANT CONSTRUCTION PIT SCHEDULING TOOL AND LOG

(75) Inventors: Paul W. White, Kennesaw, GA (US); William M. Seal, Chelsea, AL (US); William P. Geer, Jacksonville, FL (US); Terry L. Small, Irondale, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 1079 days.

(21) Appl. No.: 10/029,797

(22) Filed: Dec. 31, 2001

(51) Int. Cl.
*G06Q 10/00* (2006.01)
(52) U.S. Cl. .................................................. 705/8
(58) Field of Classification Search ............... 705/8
See application file for complete search history.

(56) References Cited

U.S. PATENT DOCUMENTS

| | | | | |
|---|---|---|---|---|
| 5,432,838 | A * | 7/1995 | Purchase et al. | 455/523 |
| 5,960,404 | A * | 9/1999 | Chaar et al. | 705/8 |
| 6,005,560 | A * | 12/1999 | Gill et al. | 715/500.1 |
| 6,216,108 | B1 * | 4/2001 | LeVander | 705/7 |
| 6,249,836 | B1 * | 6/2001 | Downs et al. | 710/268 |
| 6,678,714 | B1 * | 1/2004 | Olapurath et al. | 718/104 |
| 6,859,523 | B1 * | 2/2005 | Jilk et al. | 379/32.01 |
| 6,938,048 | B1 * | 8/2005 | Jilk et al. | 707/102 |
| 6,947,959 | B1 * | 9/2005 | Gill | 715/501.1 |
| 7,024,157 | B1 * | 4/2006 | Waye et al. | 455/3.05 |
| 2002/0019825 | A1 * | 2/2002 | Smiga et al. | 707/102 |

OTHER PUBLICATIONS

"Mine automation" by John Chadwick, Mining Magazine, v172, n6, Jun. 1995.*
"Optimun multi period open pit mine production scheduling" by K Dagdelen, Dissertation Abstracts International Part B : Science and Engineering, 1986.*
"Mincom launches Ellipse 5.0 web-enabled e-business asset management solution", Business Wire, Feb. 11, 2000.*
"Komatsu selects e-parcel for CAD data delivery", Business Wire, Jul. 13, 1999.*
"Komatsu shows technological leadership as first manufacturer to deploy Fullscope, Inc's global enterprise platform", PR Newswire, Nov. 20, 2000.*

(Continued)

*Primary Examiner*—Romain Jeanty
*Assistant Examiner*—Linda Krisciunas
(74) *Attorney, Agent, or Firm*—Withers & Keys, LLC

(57) ABSTRACT

A method for managing three groups, the method comprising the steps of: providing a first group with access to a web application, to place a first command into the web application; providing a second group with access to the web application, to receive the first command from the first group; providing the second group with access to the web application, to respond that the first command has been completed into the web application; providing the first group with access to the web application, to place a second command into the web application; providing a third group with access to the web application, to receive the second command from the first group; providing the third group with access to the web application, to respond that the second command has been completed into the web application; providing the first group with access to the web application, to place a third command into the web application; providing the second group with access to the web application, to receive the third command from the first group; and providing the second group with access to the web application, to respond that the third command has been completed into the web application.

15 Claims, 8 Drawing Sheets

OTHER PUBLICATIONS

"Towards the minerless mine" by Mike Woof, Metal Bulletin Monthly, Jul. 1999.*
"Satellites spur precision mining" by K. Korane, Machine Design, May 21, 1998.*
webarchive pages from www.minemax.com, Mar. 2001 (7 pages).*
"Black Thunder boosts production with Minestar" by Russell Carter, Coal Age, Oct. 2001.*
"Embracing New Technology" by Chad Dorn et al, Pit & Quarry, Jan. 2001.*
"Networking the building team" by Danner, Building Design & Construction, Aug. 2001.*
"Collaborative Systems Move Closer; webs and nets speed design and project management links" by Matthew Phair, ENR, Jul. 13, 1998.*
"Improving Project Team Interaction", Cost Engineering, Dec. 1994.*
"Software solutions", Pit & Quarry, Aug. 2001.*
"Contractors can use the internet to contact jobsites" by John Hall, Air Conditioning, Heating and Refrigeration News, Nov. 29, 1999.*
"Project Management in Construction: Software use and research directions" by Liberatore et al, Journal of Construction Engineering and Management, Mar.-Apr. 2001.*
"Project Management Application Models and Computer-assisted Construction Planning in Total Project Systems" by Froese et al, International Journal of Construction Information Technology, Summer 1997.*
"Mincom unveils first fully-integrated IT solution for mining: enterprise mining solution", Business Wire, Mar. 8, 2000.*

* cited by examiner

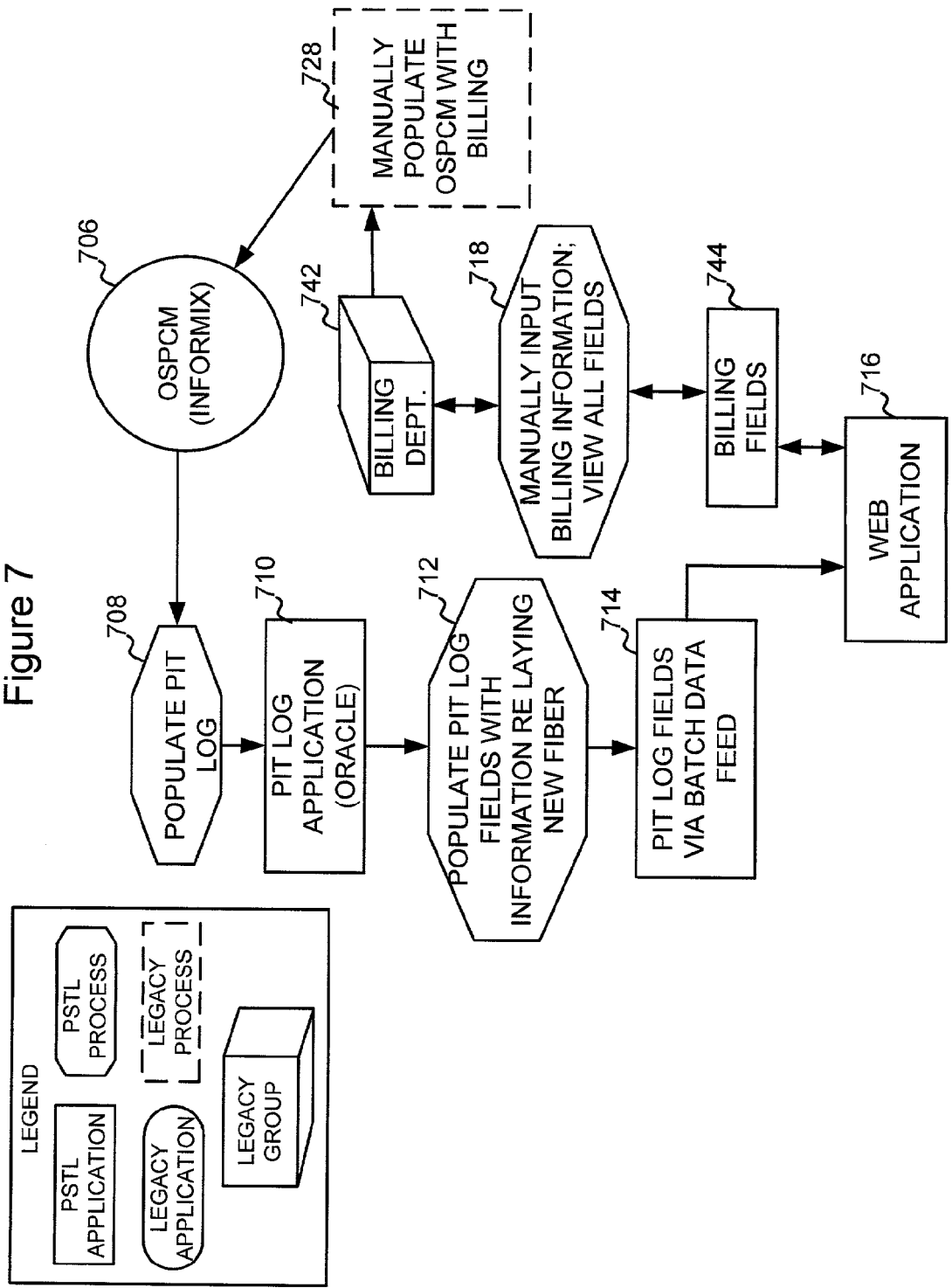

SYSTEM AND METHOD FOR OUTSIDE PLANT CONSTRUCTION PIT SCHEDULING TOOL AND LOG

BACKGROUND

1. Field of the Invention

The present invention relates generally to systems and methods for managing jobs and tasks, and, more particularly, to systems and methods for managing, scheduling, and retaining a record of the construction of pits and the tasks associated with the pits and for managing labor and materials associated with such construction and tasks.

2. Background of the Invention

The Regional Bell Operating Companies (RBOCs) must excavate and backfill tens of thousands of pits each year to lay new underground telephone fiber and to uncover damaged underground telephone fiber for repairs. The RBOCs usually contract these pit excavating and backfilling jobs to a pit contractor, each pit contractor covering a certain geographical area within the areas in which the RBOC operates. Once a pit contractor has excavated (opened) a particular pit, the RBOC uses technicians to repair or lay new fiber in that pit. After the technicians have finished their work in that pit, the pit contractors backfill (close) that pit.

Over the years, various ways to manage these operations sprang up as each of many RBOC technician managers created his own system. For simplicity, this description will refer to this conglomerate of many different systems as the "ad-hoc pit management system." Even though the ad-hoc pit management system is a conglomerate, there are many generalities across the many different systems within the ad-hoc pit management system. As such, when referring to the ad-hoc pit management system this description will sometimes refer to actions common to all of the many different systems but other times will be pointing out the strengths or flaws of a smaller group from within the many different systems. In both cases, they will be referred to simply as the ad-hoc pit management system.

With this current ad-hoc manner of managing pits inherited and currently used by most of the RBOCs (ad-hoc pit management system), information passes between different persons inside and outside of the RBOC to establish that a pit needs to be opened; when and where to open a pit and of what type; when and where the technician must lay new fiber or repair previously installed fiber; and when to close the pit. Under the ad-hoc pit management system, to perform these functions information passes from various RBOC personnel to the technician managers, and then back and forth between the technician managers and (i) the technicians who work with underground fiber (technicians), and (ii) contractors who open and close pits (pit contractors).

Acting as part of the ad-hoc pit management system, the technician managers, technicians, and pit contractors pass information, which passes in many different ways. On an ad-hoc basis, some technician managers communicate by telephone, some by fax, and some by email. The technicians and contractors communicate back to the technician manager also in at least one of these three ways. Because of this ad-hoc manner of communicating, some information is lost, some is delayed, and some is inaccurately transferred. This causes pits to be delayed in opening and closing, not opened, or opened at incorrect locations. In some cases, such as when a pit is open too long, these errors can endanger the public. In other cases, these errors cost a great deal of money: some by having to dig pits over again; some by misallocating resources, such as allocating technicians to pits not yet properly opened; some by loss of revenue for services dependent on the repair of the underground fiber not being timely resumed; some by increased changes from pit contractors for pits staying open too long. For example, with the ad-hoc pit management system, when the technician manager believes that a pit has been opened and opened in the right location and of the right type, he instructs his technicians to go to the pit and to repair or lay new fiber. Unfortunately, however, under the ad-hoc pit management system, the technician manager is correct only about seventy percent of the time. As a result, the pits are often not opened or are not opened properly. Because of this, when a technician is sent by the technician manager to the pit to perform a job, thirty percent of the time the technician cannot perform his task because the pit is not ready. The technician manager must then reallocate the technician to other jobs and must contact the pit contractor to instruct the contractor to open the pit properly. This waste of the technician manager's time and the technician's time wastes the RBOC's resources.

Also as part of the ad-hoc pit management system, internal information passes from RBOC personnel to the technician manager, generally to establish a need to open or close a pit. This information often comes from persons. For example, in the RBOC's customer service department, such as when a customer complains about a pit being open too long; in the emergency cable repair department, usually stating that service has been interrupted due to a fiber failure that must be repaired; or the engineering department via the OutSide Plant Construction Management system (OSPCM) (as set forth in patent application Ser. No. 09/151,666), which is incorporated by reference herein, setting forth pits that need to be opened in order to lay new underground fiber. While this internal information is generally more accurately and consistently communicated to the technician manager than information between the technician manager and the technicians and pit contractors, it still suffers from delays and information being lost.

Generally, if the customer service, engineering, or the emergency cable repair departments wish to communicate a need to repair a fiber or to lay new fiber (and thus to open or close a pit) to the technician manager, the technician manager may not know of such need until the next day. This is because these departments must rely on phone calls, faxes, emails, or similar systems that, even when successfully communicated, often require the technician manager to call/fax/email back to the applicable department to get further details rather than immediately order the pit contractor to open or close a pit. Thus, the ad-hoc pit management system is sluggish—delaying resumption of service, new service, or further irritating customers that wish a pit to be closed.

In addition to these different persons inside and outside of the RBOC passing information as part of the ad-hoc pit management system, some of the technician managers attempt to create a record based on compiling facts regarding: (i) when each pit was opened and closed; (ii) the location of each pit; (iii) pits that were unsafe; (iv) any disputes or suits arising out of a pit or the project associated with it; (v) how long after requesting a pit contractor to open a pit did it take for the contractor to open the pit; (vi) how long after requesting a pit contractor to close a pit did it take for the contractor to close the pit; (vii) how often a particular pit contractor improperly opens a pit; and (viii) how often a pit contractor bills the RBOC for closing a pit when that pit was not closed or not properly closed. Unfortunately, the ad-hoc pit management system, through its various technician managers, compiles a record of these events often inconsistently and inaccurately, making the compiled record incomplete and untrustworthy. In addition, even when correct, the ad-hoc pit management system, through the technician managers, retains these records in divergent and hard-to-access ways. These ways include by hand-written notes on scratch pads, differing formats on word processing documents, and differing formats in spread sheets, among others. Because of this, the ad-hoc pit management system fails to compile an adequate history of these events.

Also, the ad-hoc pit management system fails to make what information it does retain easily or quickly accessible. As noted above, the ad-hoc pit management system compiles the record of events surrounding each pit job inaccurately and incompletely, but further fails in that these records are difficult to access. These hand-written notes, various word processing files, and spread sheets, are not accessible to most of the persons and groups needing such information. Thus, even if the events are compiled, they are very difficult to access, if at all.

Further, the ad-hoc pit management system fails to passively notify, and often to actively notify, the technician managers, as well as other persons in need of such information, of changes made to the requirements of how and where new fiber is to be laid or old fiber repaired. Because of this, technician managers often fail to instruct technicians and pit contractors of changes in requirements, requiring work to be performed again or the RBOC to settle for work done incorrectly.

Lastly, the ad-hoc pit management system fails to grant adequate feedback from the pit contractor, delaying the opening of pits. Under the ad-hoc pit management system, the technician manager instructs the pit contractor when to open the pit and the pit contractor responds as to when he will have the pit open. Usually, under the ad-hoc pit management system, the pit contractor will take seven to ten days to have the pit open and will not respond back to the technician manager as to when the pit was actually opened. For this reason, the pit contractor does not have an incentive to open the pits quickly because the pit contractor does not have to inform the technician manager as to when the pit is actually opened, just that the pit contractor intends to have it opened by a certain date.

SUMMARY OF THE INVENTION

The present invention addresses the problems described above by providing systems and methods for managing jobs. A preferred embodiment of a system and method according to the invention is referred to herein as the Outside Plant Construction Pit Scheduling Tool and Log (PSTL) system and method. The PSTL manages jobs by relaying, in real-time, communications between groups working to order or complete the jobs; retaining those communications in an easily accessible record; and notifying some groups in real-time of changes to how the job is to be performed.

By so managing these jobs and the groups performing them, the PSTL eliminates the need for much of the paperwork and clerical work required in the ad-hoc pit management system, thereby reducing workload and overhead. The PSTL also systematizes the actions of many groups within and without the RBOC, allowing consistent handling of the opening and closing of pits as well as managing of the technicians working in the pits. The PSTL also keeps track of many communications between the groups, compiling a history of the actions memorialized in those communications as well as making those communications faster, more reliable, and with greater information content that the ad-hoc pit management system. Also, the PSTL requires the pit contractor to input a great deal of information, thereby keeping the pit contractor accountable for the pit contractor's performance.

In addition, because the PSTL system and method records most of the communications between the groups, it compiles a broad and diverse record of the groups' communications and, therefore, their actions. The PSTL produces reports based on this record thereby allowing the groups and others to analyze each group's performance or to assess other aspects of or related to the PSTL, such as, for example, by producing reports about a particular pit.

The present invention not only may be applied as set forth in the preferred PSTL embodiment, it may also be applied in many other ways. One example of such a way, is through management of the timing of different groups, where each group's tasks cannot be completed until the prior group has finished at particular task. For example, a general contractor attempting to build a house must manage various subcontractors. The foundation must first be laid, then the frame on top of the foundation, then the plumbing within the frame, and so on. With the present invention, the general contractor can use an application, such as an intranet- and/or internet-based application, to command a first subcontractor to lay the foundation, after which the first subcontractor would then note its progress and completion in the application; then a second subcontractor would know that it can start the frame, after which the second subcontractor would then note its progress and completion; and then a third subcontractor could begin the plumbing, and so on. In this example, not only would each subcontractor know what has been done so that each group could begin work at an appropriate time, but the contractor would be able to manage each subcontractor through the present invention's record-keeping and communication abilities.

BRIEF DESCRIPTION OF THE DRAWINGS

The accompanying drawings, which are incorporated in and form a part of the specification, illustrate preferred embodiments of the present invention and, together with the written description, serve to explain the principles of the invention. In the drawings:

FIG. 7 is a billing process flow according to an implementation of the preferred embodiment of the invention.

DETAILED DESCRIPTION OF THE INVENTION

Reference will now be made in detail to preferred embodiments of the invention, non-limiting examples of which are illustrated in the accompanying drawings and/or described below.

Figure 1:
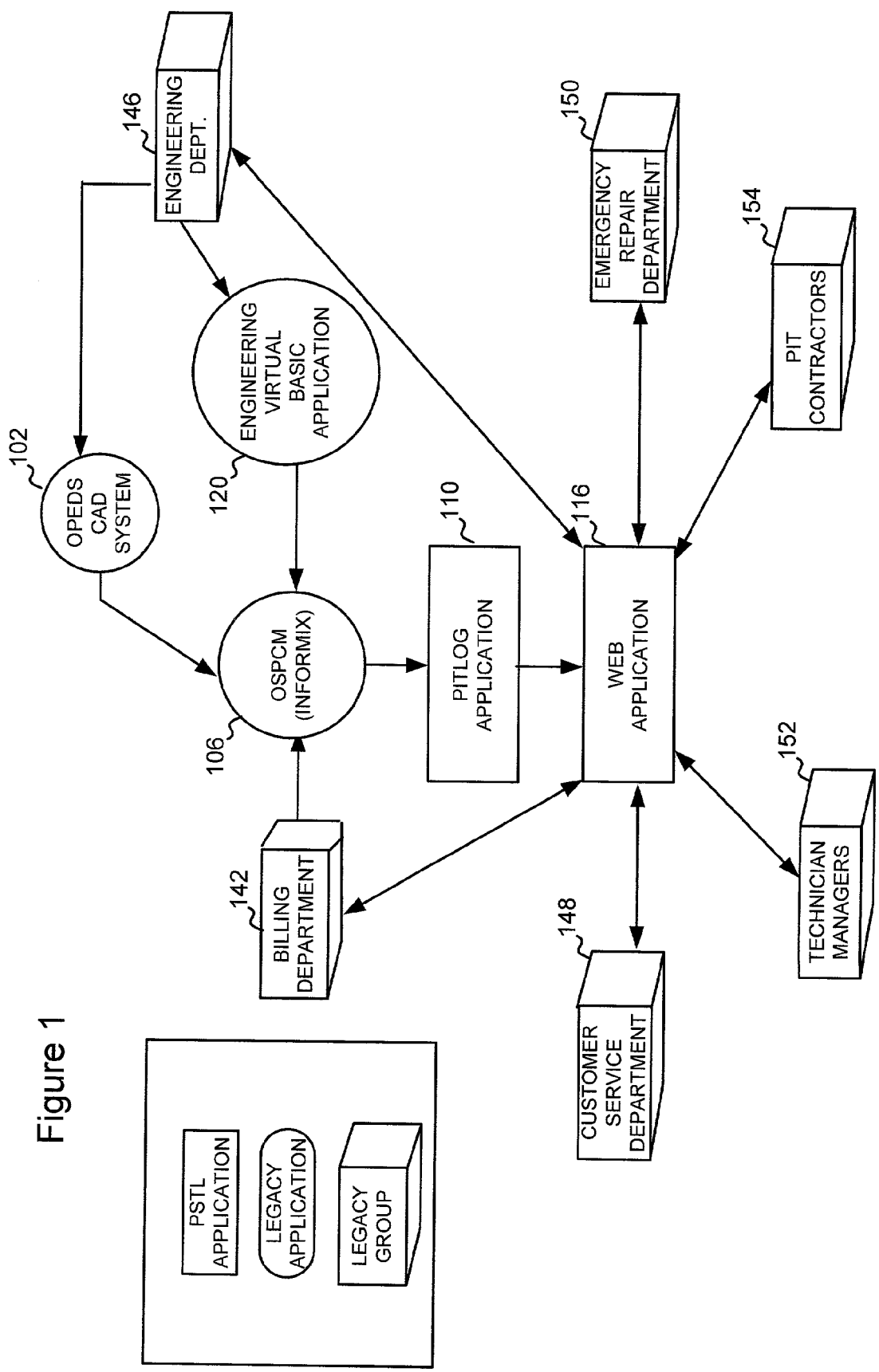
FIG. 1 is an overall process flow according to an implementation of a preferred embodiment of the invention.

With reference to FIG. 1, processes and systems according to the preferred embodiments of the invention will now be described. One process according to the invention comprises a Outside Plant Construction Pit Scheduling Tool and Log (PSTL) process that is a method for managing a plurality of groups, including the RBOC's engineering department 146, customer service department 148, emergency repair department 150, technician managers 152, technicians, pit contractors 154, and billing department 142 (a "group" or "groups"). The PSTL manages these groups through communication with a central body of information (the PSTL web application 116). For simplicity, FIG. 1 does not include any process steps or applications except for the legacy applications (legacy OutSide Plant Construction Management (OSPCM) 106, legacy Outside Plant Engineering Desktop (OPEDS) cad system 102, and legacy engineering visual basic application 120) and the PSTL pit log application 110 and web application 116.

Figure 1A:
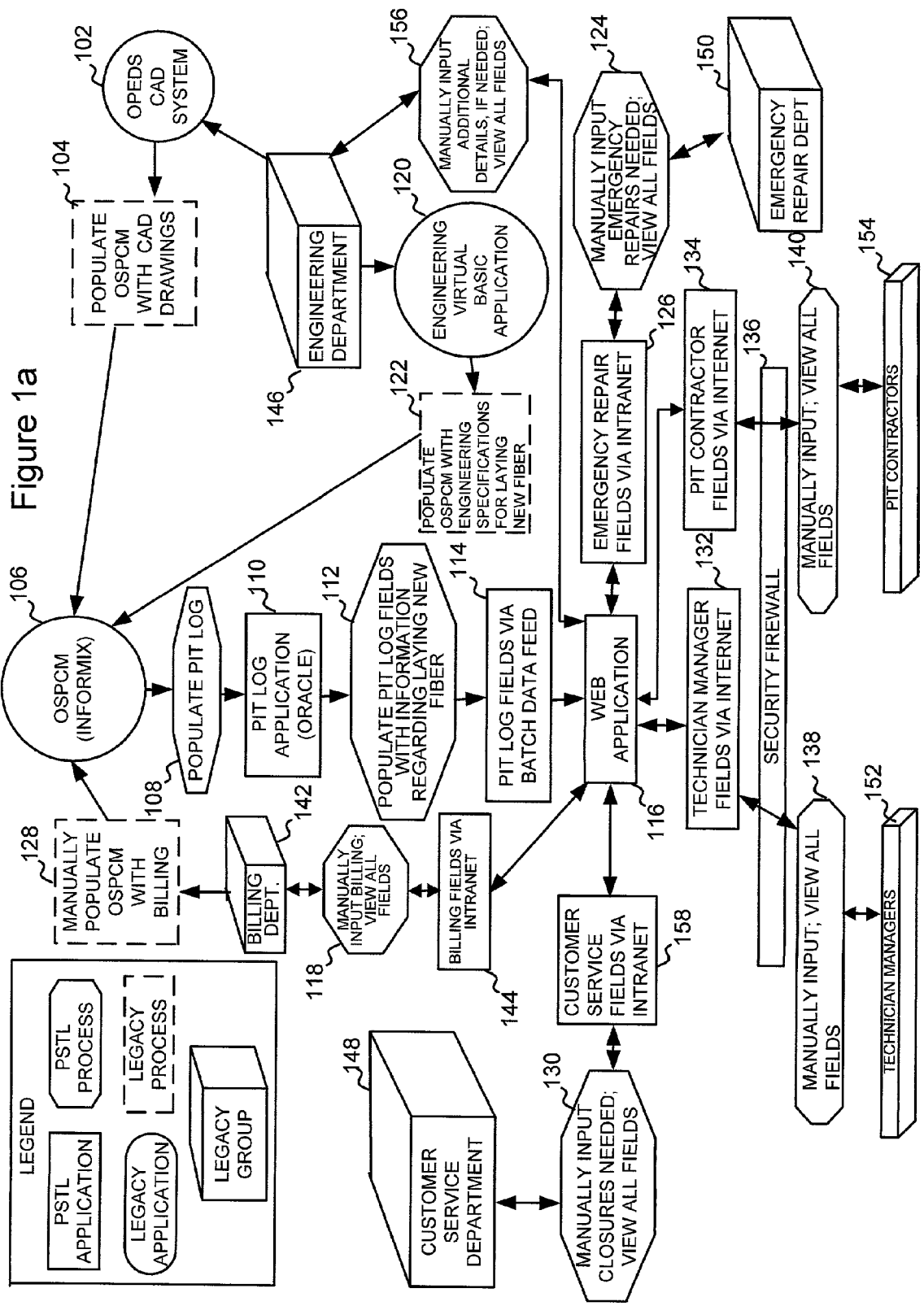
FIG. 1a is a detailed overall process flow according to an implementation of the preferred embodiment of the invention.

With this basic overview in place, FIG. 1a will now be described. FIG. 1a includes most of the legacy and PSTL process steps and applications. Specifically, and with reference to FIG. 1a, the PSTL manages these groups in part by providing the engineering department 146 with visual access to all of the fields within the PSTL web application 116 as well as by allowing input of certain information through manual entry (both according to process at 156) and various legacy applications (OPEDS cad system 102 and engineering visual basic application 120). The various legacy applications communicate with the PSTL web application 116 (according to the process set forth at 104 and 122) to populate information into pit log fields 114 of the PSTL web application 116. This information populated by the engineering department 146 can be in textual or blueprint format and generally concerns the technical aspects of the task needed to be performed by the technicians for laying new fiber in a particular pit, as well as technical aspects of what type of pit needs to be opened, when, and where.

Once the pit log fields 114 are populated with this information by the engineering department 146, all of the other groups may read and print and otherwise make copies of these fields via screens generated by the PSTL web application 116, thereby knowing the technical aspects of a particular job for laying new fiber. This technical information is easily available to all of the groups, but is of extreme import to the technician managers 152 because the technician managers 152 need this information to instruct the technicians and pit contractors 154. The technician managers 152 can easily read, print, and transfer electronic copies of the technical information in the pit log fields 114, allowing the technician managers 152 to give the information to the technicians in hard copy, by visual access by reading the appropriate screen of PSTL the web application 116, or by emailing this information directly to the technicians.

Further, the information in pit log fields 114 is also of great import to the pit contractors 154. The pit contractors 154 can easily access the information in the pit log fields 114 in the same way as the technicians above, allowing them to easily plan when, where, and how to open a particular pit. The PSTL is especially useful in that it provides a way to print, copy, and electronically transfer this information, whether it be in textual or blueprint format.

Also with reference to FIG. 1a, the PSTL manages the plurality of groups, including the RBOC's engineering department 146, customer service department 148, emergency repair department 150, technician managers 152, technicians, pit contractors 154, and billing department 142, in part by providing the emergency repair department 150 with real-time communication with the PSTL web application 116. The emergency repair department 150 may visually access all of the fields in the PSTL web application 116, as well as manually input information into the emergency repair fields 126 through an RBOC intranet.

One of the many features of the PSTL is that it provides a method and system whereby the technician managers 152 are able to immediately know of the information manually input by the emergency repair department 150, such as when the information in the fields reveals that a certain fiber failure has caused a loss of service. Rather than needing to contact the technician managers 152 in person, thereby severely delaying the transfer of the needed specifics as to the fiber failure, once the emergency repair department 150 manually inputs the relevant information regarding the fiber failure, the technician managers 152 may learn of it instantly.

Also with reference to FIG. 1a, the PSTL manages the plurality of groups, including the RBOC's engineering department 146, customer service department 148, emergency repair department 150, technician managers 152, technicians, pit contractors 154, and billing department 142, in part by providing customer service department 148 with real-time communication with the PSTL web application 116. The customer service department 148 may visually access all of the fields in the PSTL web application 116, as well as manually input information into customer service fields 158 through an RBOC intranet. Generally, customer service department 148 inputs information in customer service fields 158 to request that certain pits be closed because of complaints received by customer service department 148 from customers complaining that a certain pit has been open too long.

Also with reference to FIG. 1a, the PSTL manages the plurality of groups, including the RBOC's engineering department 146, customer service department 148, emergency repair department 150, technician managers 152, technicians, pit contractors 154, and billing department 142, in part by providing technician managers 152 with real-time communication with the PSTL web application 116. The technician managers 152 may visually access all of the fields in the PSTL web application 116, as well as manually input information into technician manager fields 132 via the internet through a security firewall 136.

The technician managers 152 communicate with the PSTL web application 116 regularly, and by so doing manage the technicians and pit contractors 154. Through the PSTL, the technician managers 152 receive nearly all of the information needed to perform their job of managing the technicians and pit contractors 154, from: notice that jobs requiring new fiber to be laid must be completed; stating that a pit needs to be closed; notice of safety violations in how a pit was maintained; marking that a pit was open at a certain time; concerning fiber needing to be repaired; and regarding details about the repair or new fiber jobs needed, for example.

Also with reference to FIG. 1a, the PSTL manages the plurality of groups, including the RBOC's engineering department 146, customer service department 148, emergency repair department 150, technician managers 152, technicians, pit contractors 154, and billing department 142, in part by providing pit contractors 154 with real-time communication with the PSTL web application. The pit contractors 154 may visually access all of the fields in the PSTL web application 116, as well as manually input information into pit contractor fields 134 via the internet through a security firewall 136.

Also with reference to FIG. 1*a*, the PSTL manages the plurality of groups, including the RBOC's engineering department 146, customer service department 148, emergency repair department 150, technician managers 152, technicians, pit contractors 154, and billing department 142, in part by providing billing department 142 with real-time communication with the PSTL web application. The billing department 142 may visually access all of the fields in the PSTL web application 116, as well as manually input information into billing fields 144 through an RBOC intranet.

The billing department 142 may use this access to manually populate, according to the billing process step at 118, billing information into billing fields 144 of the PSTL web application 116. Also through this access, the billing department 142 may read, print, and electronically transfer information in these and other fields. In most cases the billing department 142 will access certain pit contractor fields 134 to determine if a pit has been closed and thus a job has been completed for which the pit contractor should be paid, and the technician manager fields 132 to see if such pit was properly closed.

The billing department 142 may also manually populate the OSPCM 106 with billing information according to the process set forth at 128. This information populated into the OSPCM 106 is then populated into the web application 116 in a process as set forth in FIG. 1*a* by numerals 108, 110, 112, and 114, and similarly to as described in FIG. 2.

The plurality of information (as set forth above and below) passing to and from different groups that are part of the PSTL is retained and compiled into a history by the PSTL. As part of this history, the PSTL creates a record of: (i) when each pit was opened and closed; (ii) the location of each pit; (iii) pits that were unsafe or were complained about by customers, city workers, or otherwise; (iv) any disputes or suits arising out of a pit or the project associated with it; (v) how long after requesting a pit contractor to open a pit did it take for them to open the pit; (vi) how long after requesting a pit contractor to close a pit did it take for them to close the pit; (vii) how often a particular pit contractor improperly opens a pit; and (viii) how often a pit contractor bills the RBOC for closing a pit when that pit was not closed or not properly closed.

Figure 2:
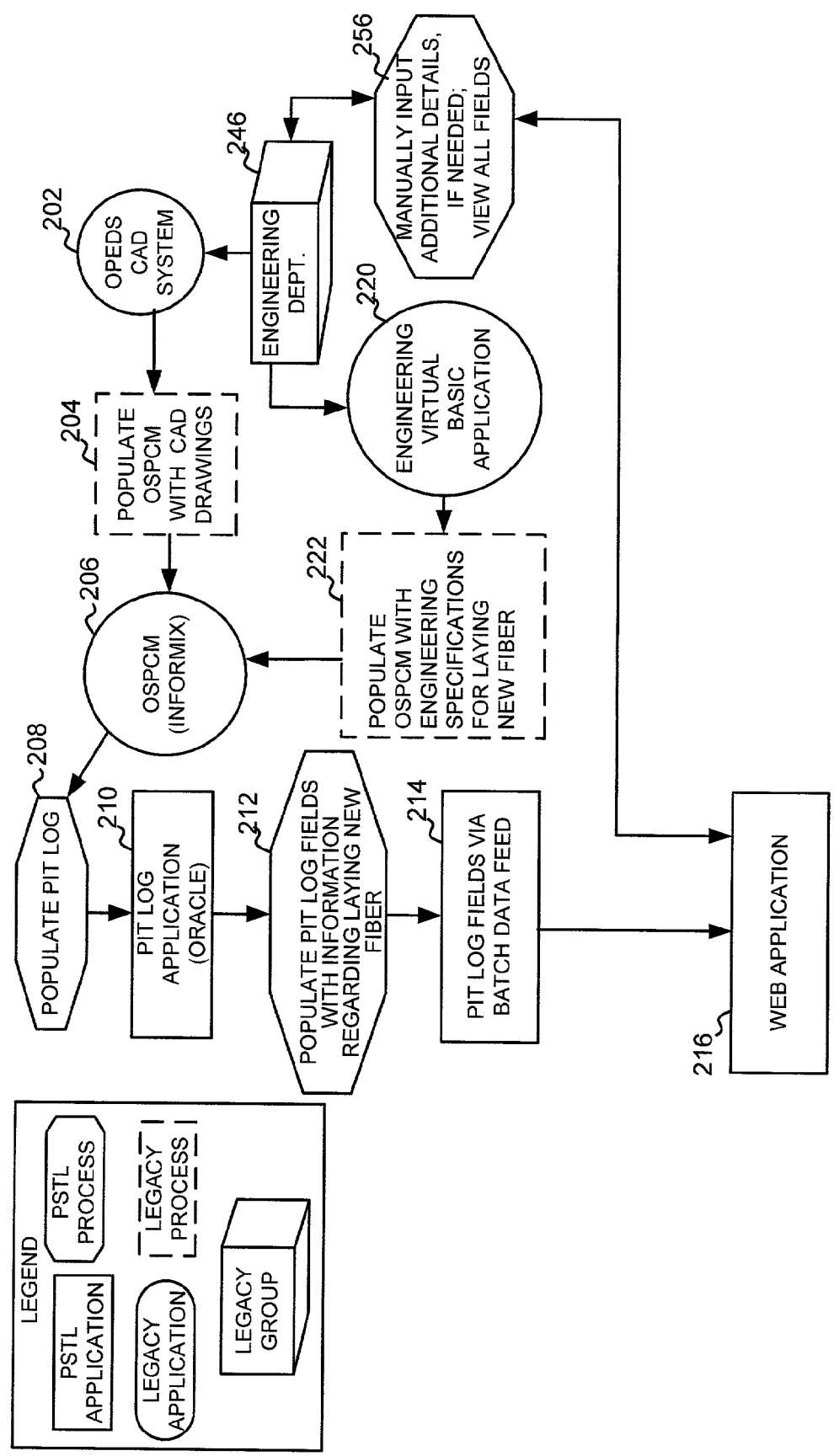
FIG. 2 is an engineering process flow according to an implementation of the preferred embodiment of the invention.

FIG. 2 further explains the PSTL system and method for managing the plurality of groups, focusing on how the PSTL manages the engineering department 246 and relevant information generated by the engineering department 246. Information from the engineering department 246 is communicated three different ways: through the legacy OPEDS cad system 202; through the legacy engineering visual basic application 220; and through manual input via particular fields in the PSTL web application 216 (discussed below).

The CAD drawings may be communicated from the engineering department 246 through the legacy OPEDS cad system 202, which populates the OSPCM 206 with the CAD drawings according to the process at 204. OSPCM 206 then populates a pit log 208, which in turn holds the CAD drawings in the pit log application 210 until pit log application 210 populates the pit log fields 214 through the process step of populating pit log fields 212. This CAD-drawing information in the pit log fields 214 concerns the technical specifications needed to properly lay new fiber. This technical information includes the CAD drawings communicated from the engineering department 246 through the OPEDS CAD system 202 as described above and also includes other technical information from the engineering department 246 through the engineering visual basic application 220 as described below. This technical information is held by the pit log application 210 throughout the workday. At the end of the day, usually late in the evening, the pit log application 210 populates the pit log fields with information 212 into the pit log fields 214 of the PSTL web application 216.

The technical information in the pit log fields 214 of the PSTL web application 216 also includes information originating with engineering department 246 that is sent through a second process. This second process is used as part of the PSTL to populate technical information dealing with the laying of new fiber, usually in textual form, rather than CAD drawings as described above. In this process, the engineering department 246 uses the legacy engineering visual basic application 220 to populate the OSPCM 206 according to the process at 222 (populate OSPCM with engineering specifications). The OSPCM 206 then populates a pit log 208, the information of which is held in the pit log application 210 until the pit log application 210 populates the pit log fields 214 through the process step of populate pit log fields 212. Under the PSTL, all of this important technical information is now easily accessible to the technicians, technician managers, and pit contractors. Each of these and the other groups can access the web application at will to study the technical information needed to properly perform the laying of new fiber and the preparing of an appropriate pit.

The technical information processed through either of these two processes and contained in the pit log fields 214 can be in textual or blueprint format, and generally describes in detail the technical aspects of the task needed to be performed by the technicians for laying new fiber in a particular pit, as well as technical aspects of what type of pit needs to be opened, when, and where.

The engineering department 246 also communicates with the web application 216 via a process of manually inputting additional details as well as viewing all fields of the web application 216 as shown at 256. Most of the information important to the technicians, technician managers 152 (FIG. 1), and pit contractors 154 (FIG. 1) is populated into the web application 216 via the pit log fields 214, the two legacy systems 202 and 220, and the legacy OSPCM 206. Occasionally, however, additional details are needed from the engineering department 246. To allow for additional details to be added, the web application 216 and remainder of the PSTL method and system are structured such that the engineering department 246 can manually alter the pit log fields 214 of the web application 216 in real-time. Thus, the engineering department 246 may make available important notes not previously available through the web application 216, and, importantly, make available new changes to the technical information in the pit fields 214 on a real-time basis. Thus, groups in need of the new or changed information may access it at any time, rather than wait for the nightly download.

An additional feature of this process, shown at 256, allows for any changes made to be marked important by the engineering department 246. By so doing, the PSTL (via email by the web application 216) alerts the technicians, technician managers, and/or pit contractors that an important technical change has been made, so that they will take such changes into account in performing the relevant job.

The engineering department 246 is also able to view all of the fields in the web application 216. By so doing, the engineering department may read details entered by another group discussing problems or successes with a particular job, or can read questions left by another group, which may be addressed to the engineering department 246. This ability to read and also to edit certain fields manually, as shown at 256, grants the engineering department and those working the tasks a complete informational loop without the need for unreliable and often-delayed phone, email, and other forms of communication.

Further, through the web application 216, the PSTL retains all of these communications, allowing the engineering department 246 and other groups to access a complete compilation and record of all these communications. By so retaining these communications, the RBOC can better understand how to improve the actions of every group and to assess problems and complications.

Figure 3:
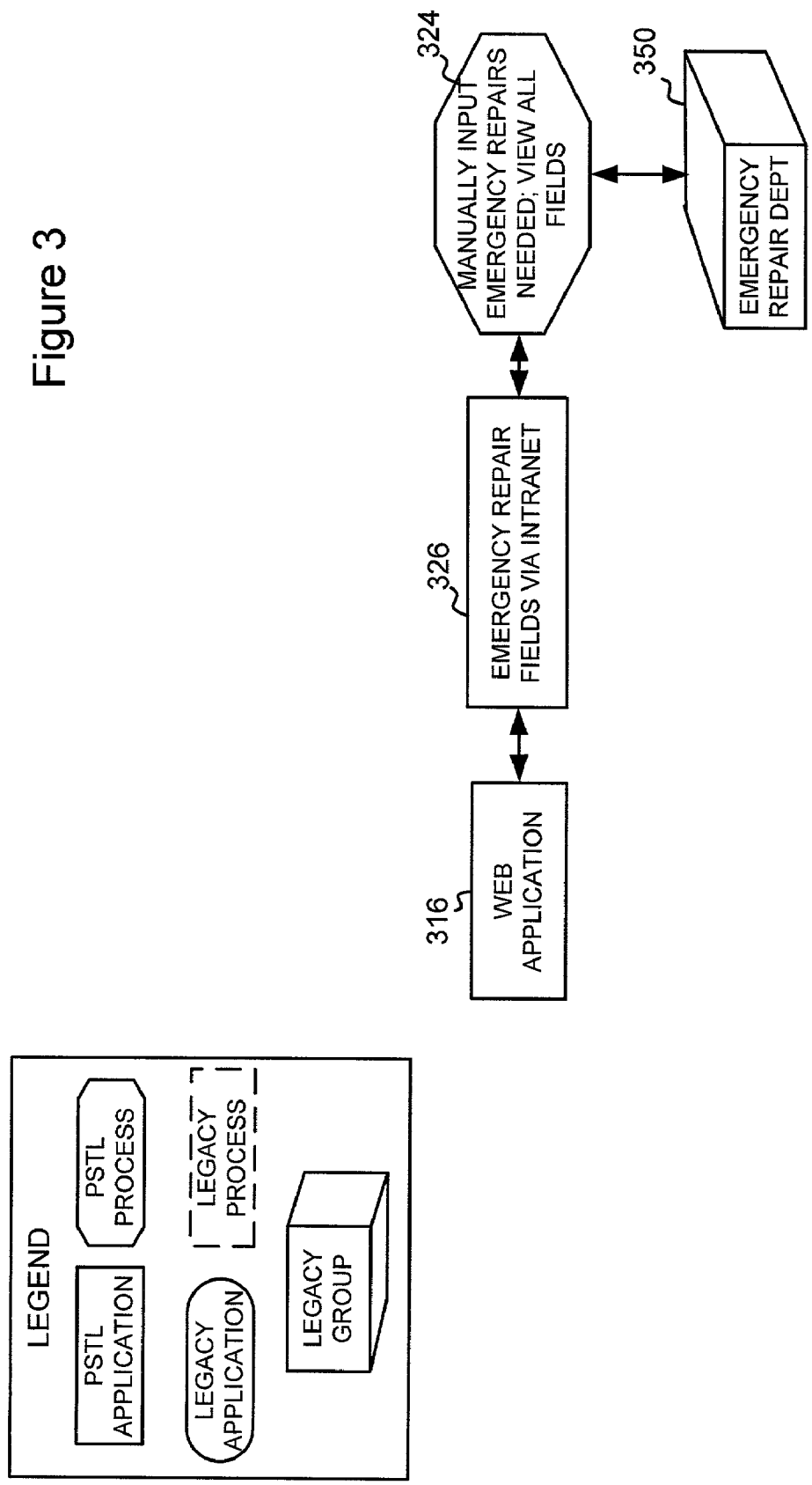
FIG. 3 is an emergency process flow according to an implementation of the preferred embodiment of the invention.

FIG. 3 further explains the PSTL system and method for managing the plurality of groups, focusing on how the PSTL manages the emergency repair department 350 and relevant information generated by the emergency repair department 350.

The PSTL manages the emergency repair department 350 in part by providing the emergency repair department 350 with real-time communication with the web application 316. The emergency repair department 350 manually inputs information into the emergency repair fields 326 through the process at 324. This information is of paramount importance to the groups performing the repairs (the technicians, technician managers, and pit contractors). The information includes details as to: where the loss of service occurred by street address; where the fiber is damaged by setting out the section of the fiber that is not functioning properly with geographic markers, if available, but at least the street address closest to the improperly functioning fiber; the time such fiber failed; by when the fiber needs to be fixed; the type of fiber and similar details so that the groups performing the repairs can use the proper tools to compete the tasks; and any other important information needed so that those performing the repairs can know exactly what needs to be done simply by accessing the emergency repair fields 326 of the web application 316. The technicians, technician managers, and/or the pit contractors can simply print off or email to their portable device or other tool the relevant information so that they will have the information at hand to best perform the repairs.

Because the emergency repair department 350 can input this important information in real time and the emergency repair fields are immediately updated for all viewers, the technician managers, technicians, and pit contractors are able to immediately know of the failure and what needs to be done. Often the technician managers will interpret the information from emergency repair fields 326 and then disseminate further details to the pit contractors and technicians either personally, by email (as part of the web application 316 or otherwise), or simply by adding additional information to the technician manager fields 132 (of FIG. 1a). These details may include additional technical information based on the technician manager's experience and scheduling details, such as setting out the order by which the numerous failures in the emergency repair fields 326 should be repaired.

The PSTL system and method also communicates information from the emergency repair department 350 regarding new repairs needed to repair damaged fiber to the technician managers by high-priority email. This email is designed to ensure that the technician manager checks the web application 316 immediately if an emergency repair is needed.

The emergency repair department 350 may visually access all of the fields in the PSTL web application 316, as well as manually input information into emergency repair fields 326, through an RBOC intranet. By so doing, the emergency repair department 350 may learn of difficulties, successes, and other details from the other groups, allowing the emergency repair department 350 to better perform its job in the future.

All of these communications to and from the emergency repair department 350 are compiled into a history by the PSTL web application 316. With this history, the RBOC and each group can improve the functioning of the groups and the whole by noting consistent failures, slow response times, and other historic details. One such historic detail concerns how quickly a certain pit contractor properly opens pits. The PSTL greatly improves the information gathering of the RBOC concerning the pit contractors by requiring exact and actual dates for the opening and closing of every pit. By so doing, the RBOC may learn of a pit contractor's poor performance such as delays in opening or closing pits and poorly opened or closed pits.

Figure 4:
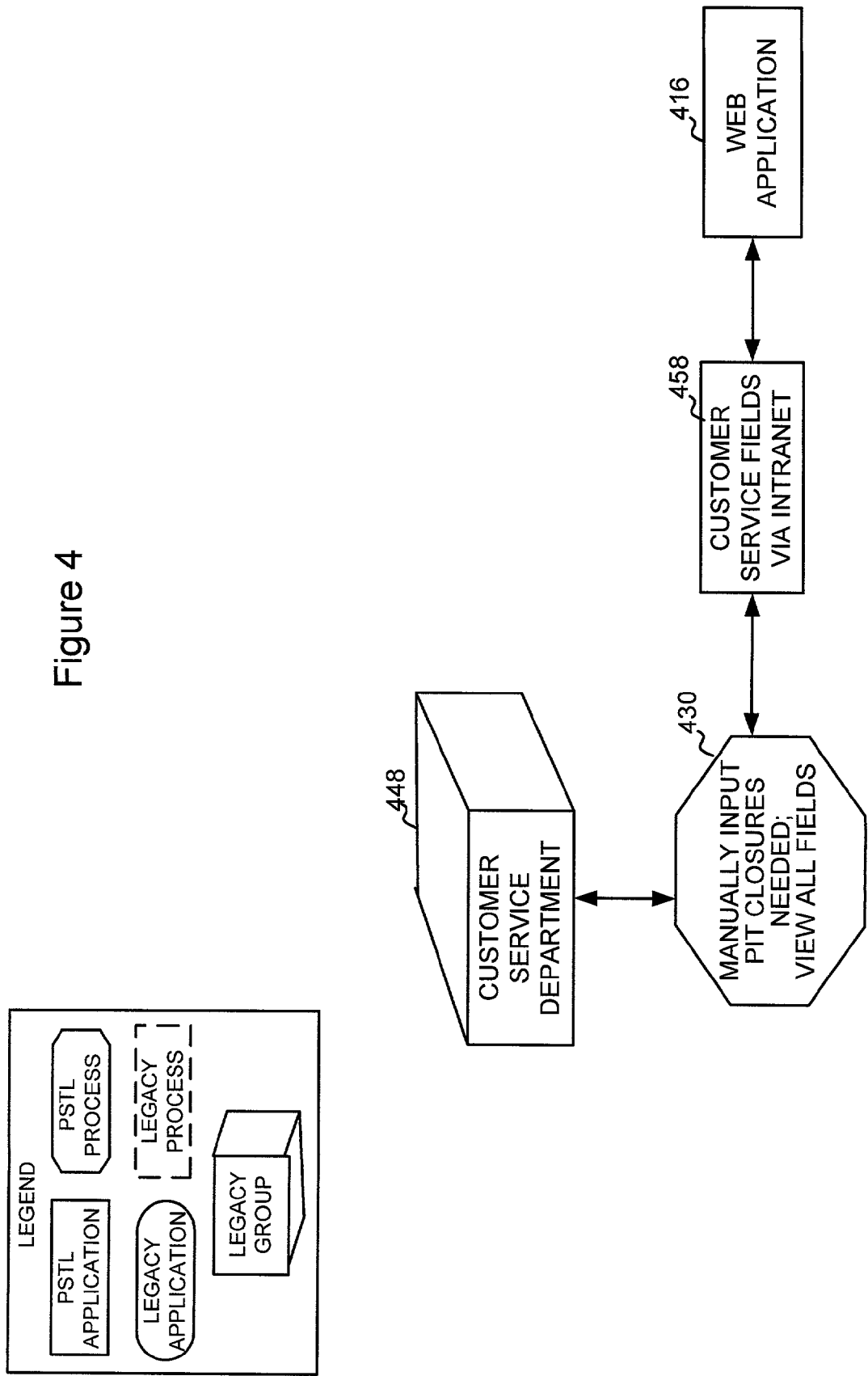
FIG. 4 is a customer servicing process flow according to an implementation of the preferred embodiment of the invention.

FIG. 4 further explains the PSTL system and method for managing the plurality of groups, focusing on how the PSTL manages the customer service department 448 and relevant information generated by the customer service department 448. The PSTL provides the customer service department 448 with real-time communication with the PSTL web application 416 and thereby real-time communication with the other groups. The customer service department 448 may visually access all of the fields in the PSTL web application 416, as well as manually input information into customer service fields 458 (according to the process at 430) through an RBOC intranet.

As part of the PSTL web application 416, customer service department 448 may only input information into customer service fields 430 to prevent the customer service department 448 from altering fields to which they have no expertise or that are dedicated to other groups managed by the PSTL. Limiting customer service department's 448 ability to input information into fields not included as customer service fields 458 also reduces the chance of confusing the personnel within the customer service department 448. Generally, the customer service department 448 inputs information in customer service fields 458 to request that certain pits be closed because of complaints received by the customer service department 448 from customers complaining that a certain pit has been open too long.

The customer service department 448 may visually access all of the fields in the PSTL web application 416. In most cases, the customer service department 448 visually accesses these fields, as well as copies and electronically transfers any field in the PSTL web application 416, in order to determine the date to which certain pits are planned to be closed, as well as to access information from other groups responding to a customer service department's 448 request for a particular pit to be closed or to find out why the particular pit is still open. Because the PSTL provides instant, real-time access to nearly all the relevant information concerning the particular pit simply by accessing screens showing all of the fields of the PSTL web application, the customer service department 448 may, while still on the phone (if applicable) with the customer, explain why the particular pit is still open, when the pit is scheduled to be closed, and any other information that may explain, and therefore usually comfort, the customer, which improves customer relations for the RBOC.

For the customer service department 448 requests for pits to be closed, the technician managers 152 (at FIG. 1a) may, for example, state that the particular pit that the customer service department 448 requested to be closed must remain open for a certain amount of time, other reasons why the particular pit has not been closed, or that due to the complaint the pit will be closed sooner. With this information, the customer service department 448 may respond quickly to the customer that requested the particular pit be closed, thereby improving customer relations for the RBOC.

Figure 5:
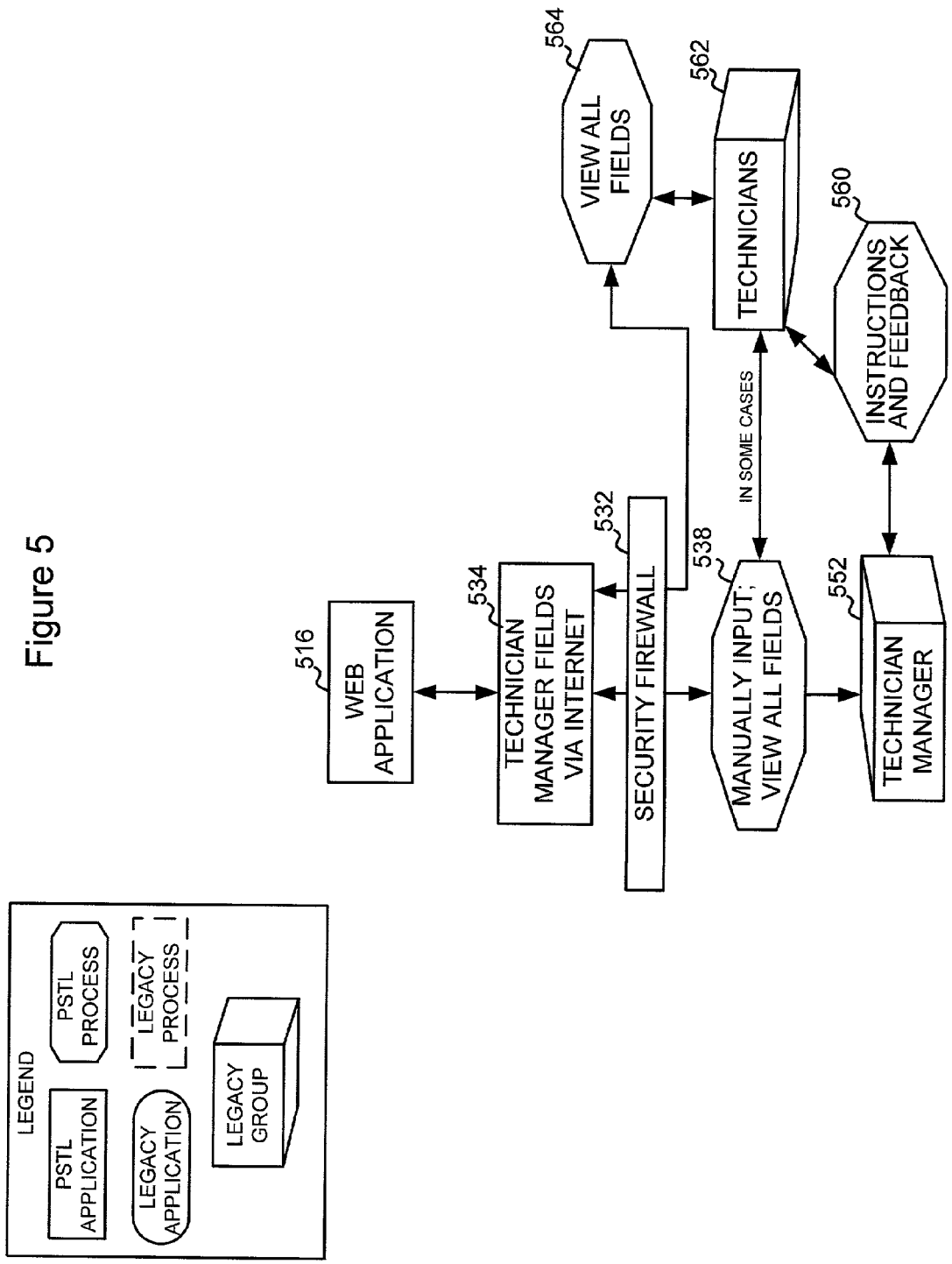
FIG. 5 is a technical managerial process flow according to an implementation of the preferred embodiment of the invention.

FIG. 5 further explains the PSTL system and method for managing the plurality of groups, focusing on how the PSTL manages the technician managers 552 with real-time communication with the PSTL web application 516 and relevant information generated by the technician managers 552. The PSTL provides the technician managers 552 with real-time communication with the PSTL web application 516 and thereby real-time communication with the other groups. Further, the technician managers 552 may visually access all of the fields in the PSTL web application 516, as well as manually input information into technician manager fields 532 through security firewall 536 through the internet.

The technician managers 552 communicate with the PSTL web application 516 more than any other group. They check often, much more than daily, the PSTL web application 516 in order to access the many fields of the PSTL web application 516 to manage the technicians 562, as well as the pit contractors 154 (at FIG. 1a). Through the PSTL, the technician managers 552 receive information from the engineering department 146 (at FIG. 1a) concerning jobs to lay new fiber; the customer service department 148 (at FIG. 1a) concerning pits that need to be closed; the emergency repair department 150 (at FIG. 1a) concerning fiber that needs to be repaired; the technicians 562 concerning what jobs they should perform, how, and when; the pit contractors 154 (at FIG. 1a) concerning pits they have opened and closed and how, where, and when; and the billing department 142 (at FIG. 1a) concerning whether or not the bill submitted by the pit contractors 154 (at FIG. 1a) is correct. As part of this access, the technician managers 552 may run certain reports, setting out all of the pits by those open, those closed and when, those in certain locations, those performed by certain technicians 562, and those opened or closed by a particular pit contractor. By having this capability to run reports and by many different criteria, the PSTL is easy to use and very useful for the technician managers 552 to better manage the technicians 562, as set forth by process at 560, and the pit contractors.

Relatedly, the PSTL manages the technicians 562 through providing the technicians 562 with real-time communication with the PSTL web application 516 and indirect input of relevant information generated by the technicians 562 through the technician managers 552. The technicians 562 may visually access all of the fields in the PSTL web application 516 through the process at 564, but usually, although not in every case, do not have access to input information into the web application 516 except through the manual input by the technician managers 552 into the technician managers fields 532 by the process described at 538. In those cases where the technicians 562 have access to input information, they do so through the technician manager fields 532 by the process at 538.

Typically, the PSTL provides real-time information to the technicians 562 through access to all fields of the web application 516. This real-time information generally concerns information such as commands to repair or lay new fiber in a particular pit. Such information will also include the type and location (usually by street address) of the pit. The technicians 562, generally through the technician managers 552, input information into technician managers fields 532 that the job at a certain pit is done; that the pit should now be closed; that the pit was improperly opened; that the repair job or laying of new fiber took a certain number of hours and encountered difficulty, for example. With this information returned to the web application 516 through the process by which the technician managers 552 input information (and in some cases, the technicians 562), the rest of the groups may learn about particular jobs. For example, the pit contractor 154 (at FIG. 1a) can learn in real-time that a certain pit may now be closed. Also for example, the emergency repair department 150 (at FIG. 1a) may learn that certain fibers have been fixed by the technicians 562 and that service has been restored. This information, and the tracking and compiling a history of same, is very useful to the RBOC in determining how best to improve the system and improve the RBOC's efficiency.

Figure 6:
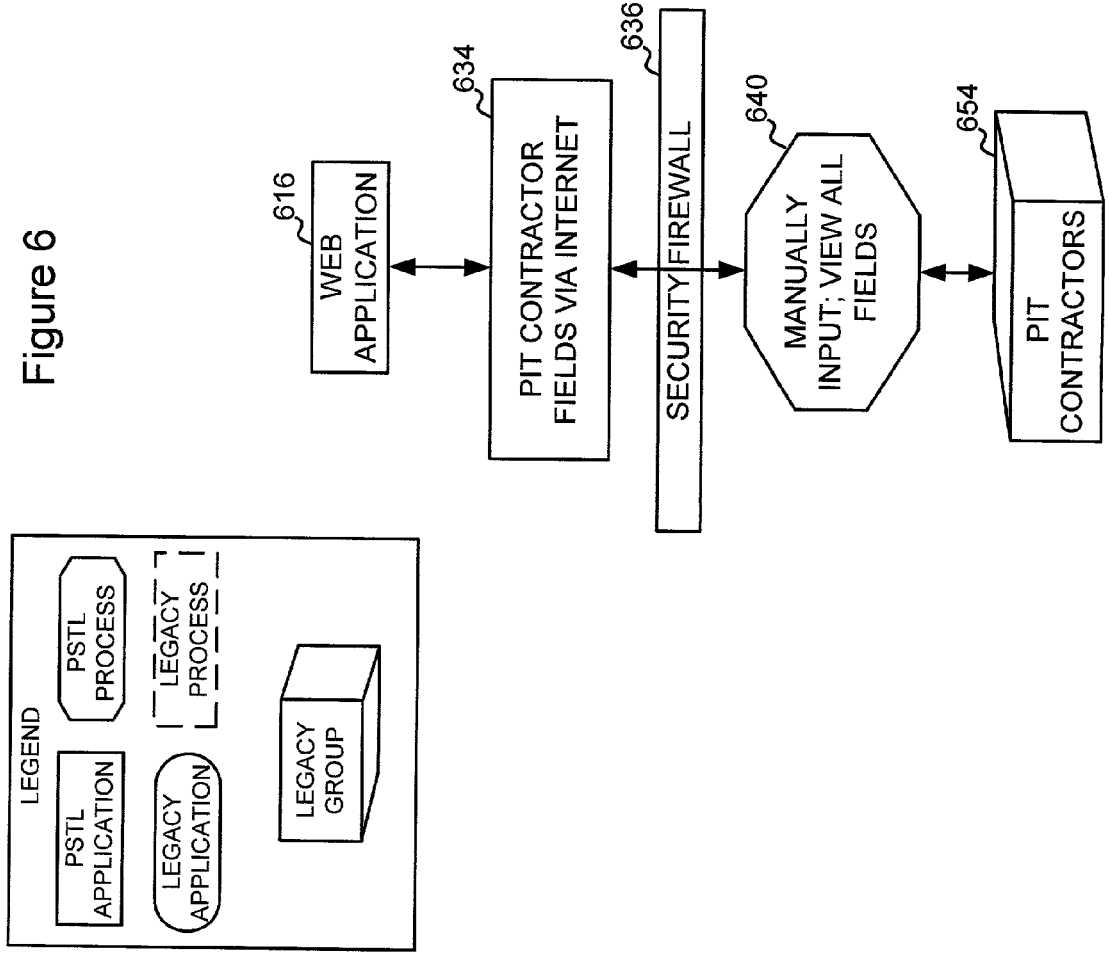
FIG. 6 is a pit contractor management process flow according to an implementation of the preferred embodiment of the invention.

FIG. 6 further explains the PSTL system and method for managing the plurality of groups, focusing on how the PSTL manages the pit contractors 654. As part of the web application 616, the pit contractors 654 may only input information into the pit contractor fields 634 to prevent the pit contractors 654 from altering fields to which they should not have access. Each pit contractor may only input information into pit contractor fields 634 related to his or her jobs, so that pit contractors do not intentionally or accidentally alter pit contractor fields 634 allocated to another pit contractor. In addition to this limitation, other limitations restrict each of the pit contractors' 654 ability to input information into fields not included as pit contractor fields 634, thereby reducing the chance of confusing the personnel of the other groups or of the pit contractors 654. Generally, the pit contractors 654 input information in the pit contractor fields 634 stating, for example: that a certain pit has been opened or closed and when, where, and how; and information regarding the bill for such services. The pit contractors 654 may also access all of the fields in the web application 616 according to the process at 640, and always through the security firewall 636. The fields of most import to the pit contractors 654 are commands from the technician managers to open or close a pit and the pit's type, location, and other technical details. Because the PSTL provides faster response from other groups than the ad-hoc management system, for example, when the technicians order a pit to be closed, the pit contractors 654 have consistently closed pits in a PSTL trial of the present invention much faster, often by two or more days. Such faster pit contractor 654 responses has saved the RBOC money, because the pit contractors 654 may charge the RBOC additional fees for having a pit opened too long. As part of this access, the pit contractors 654 may run certain reports, setting out all of the pits by those open, those closed and when, those in certain locations, those performed by certain employees of the pit contractors 654, and those asked to be opened or closed by a particular technician manager. By having this capability to run reports and by many different criteria, the PSTL is easy to use and very useful for the pit contractors 654 to better run their business. The pit contractors 654, may, for example, run reports to determine which pits need to be opened a particular day. This allows the pit contractors 654 to run their business more efficiently, allowing the pit contractors 654 to save money, which eventually translates into lower costs for the RBOC.

The PSTL also requires extensive feedback from the pit contractors 654, forcing them to more carefully track and be responsible for their tasks performed for the RBOC. These greater demands for information regarding the timing and accuracy of pit openings and closings has translated into an over sixty percent reduction in the number of days a pit takes to be opened by pit contractors taking part in a trial run of the PSTL versus the ad-hoc pit management system. This is due in part because the technician manager, as part of the PSTL, instructs the pit contractor when to open a pit and the pit contractor responds as to when he will have the pit open. More importantly, the pit contractor 654 must also respond as to the date the pit was actually opened, giving the pit contractors 654 an incentive to open pits as quickly as possible. By so doing, the RBOC saves money by reducing the occurrence of technicians being sent to pits not yet opened, thereby wasting the technicians' time.

FIG. 7 further explains the PSTL system and method for managing the plurality of groups, focusing on how the PSTL manages the billing department 742. As part of the PSTL web application 716, the billing department 742 may only input information into the billing department fields 744 or the pit log fields 714 (according to the process set forth at 728, 706, 708, 710, and 712) to prevent the billing department 742 from altering fields to which they have no expertise or that are dedicated to other groups managed by the PSTL. Limiting the billing department's 742 ability to input information into fields not included as billing department fields 744 also reduces the chance of confusing the personnel within the billing department 742. Generally, the billing department 742 inputs information into the billing department fields 744, according to the process at 718, to determine what bills or invoices the pit contractors have input into the web application and whether or not the technician managers disagree with the accuracy of such bills or invoices.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for managing groups responsible for pit activities, the method comprising the steps of:

populating database fields of a web application by an engineering group with data that specifies details of pits, wherein the population is conducted manually and automatically from both legacy Computer Automated Design systems and legacy visual basic systems;

providing the technician manager group with limited access to the web application a first time, receiving from the technician manager via the web application during the first time a first command into the web application that instructs the pit contractor group to open a pit, wherein the technician management group has read access to all data fields in the database related to the first command;

providing the pit contractor group with limited access to the web application a first time, executing the first command by opening the pit, wherein the command is issued from the technician manager to the pit contractor group via the web application and providing the pit contractor group with read access to all of the data fields required to successfully execute the first command to open the pit during the first time;

providing the pit contractor group with limited access to the web application a second time, receiving a response into the web application from the pit contractor that the first command has been completed by opening the pit, wherein the response includes additional data related to the completion of the first command wherein the additional data comprises the location of the pit and details regarding how the pit was opened;

providing the technician manager group with limited access to the web application a second time, receiving from the technician manager during the second time a second command that instructs the technician group to perform a cable task within the pits of the first command into the web application wherein the technician manager group has read access to all data fields in the database related to the second command;

providing the technician group with limited access to the web application a first time, receiving by the technician group via the web application during the first time the second command from the technician manager group providing the technician group with read only access to the data fields required to successfully execute the second command, executing the second command by performing the cable task within the pit once it is opened by the pit contractor, providing the technician group with limited access to the web application a second time, receiving a response from the technician group via the web application during the second time that the second command has been completed, wherein the response includes additional data related to the completion of the second command that comprises the number of hours required to complete the cable task within the pit and wherein the write access to respond is via the technician manager group;

providing the technician manager group with limited access to the web application a third time, receiving from the technician group via the web application during the third time a third command to close the pit where the cable task has been completed wherein the technician manager group has read access to all data fields in the database related to the third command;

providing the pit contractor group with limited access to the web application a third time, receiving by the pit contractor group via the web application during the third time the third command from the technician manager group and providing the pit contractor group with read access to all of the data fields required to successfully execute the third command, executing the third command by closing the pit where the cable task has been completed;

and providing the pit contractor group with limited access to the web application a fourth time, receiving from the pit contractor group via the web application during the fourth time that the third command has been completed, wherein the response includes additional data related to the completion of the third command including where the pit was closed and details regarding how the pit was closed; wherein further responses of the pit contractor and technician groups also includes high priority e-mail.

2. The method of claim 1, wherein the web application is accessed through a global internet and a local intranet.

3. The method of claim 1, wherein the steps must occur in chronological
order.

4. A method for managing groups responsible for pit activities, the method comprising:

populating the fields of a database by an engineering group with data that specifies details of a pit, wherein the population
is conducted manually and automatically from both legacy Computer Automated Design systems and legacy visual basic systems;

providing a technician manager group with limited write access to the web application a first time;

receiving first information from the technician manager group during the first time into the web application regarding opening the pit by the pit contractor group;

executing opening the pit;

providing the pit contractor group with access to the web application during a first time, a step of receiving by the pit contractor during the first time the first information from the technician manager group via the web application;

providing the pit contractor group with limited write access to the web application a second time, receiving a second information from the pit contractor during the second time into the web application regarding where and how the pit was opened by the pit contractor;

providing the technician manager group with access to the web application a second time, receiving by the technician manager group during the second time the second information and providing limited write access to the technician manager group receiving a third information from the technician manager group during the second time into the web application regarding performing a cable related task within the pit;

executing the cable related task;

providing the technician group with access to the web application a first time, receiving by the technician group during the first time via the web application the third information from the technician manager group;

providing the technician group with access to the web application via the technician manager group during a second time, receiving a fourth information from the technician group via during second time into the web application regarding completion of the cable related task within the pit;

providing the technician manager group with access to the web application a third time, receiving by the technician manager via the web application during the third time the fourth information and providing limited write access to place a fifth information into the web application regarding closing the pit by the pit contractor;

executing closing the pit;

providing the pit contractor group with access to the web application a third time, receiving by the pit contractor group via the web application during the third time the fifth information from the technician manager group; and providing the pit contractor group with limited write access to the web application a fourth time, receiving from the pit contractor during the fourth time a sixth information into the web application regarding where and how the pit was closed by the pit contractor.

5. The method of claim 4, wherein the web application must be accessed through a global internet.

6. The method of claim 5, wherein the web application must be accessed through a security firewall between the global internet and the web application.

7. The method of claim 4, wherein the first, third, and fifth information are commands.

8. The method of claim 7, wherein the second information responds to the first information, the fourth information responds to the third information, and the sixth information responds to the fifth information.

9. A method for managing a plurality of groups responsible for pit activities, the method comprising the steps of:

creating a central body of information by an engineering group with data that specifies details of a pit, wherein the population is conducted manually and automatically from both legacy Computer Automated Design systems and legacy visual basic systems:

providing a technician manager group of the plurality of groups with limited write access to a central body of information;

receiving information into the central body of information in real time regarding opening a pit and performing a cable task within the pit once the pit is opened;

providing a pit contractor group of the plurality of groups with unlimited read access to the central body of information a first time;

receiving by the pit contractor during the first time information from the technician manager group in real time from the central body of information to be instructed regarding opening the pit;

executing the task of opening the pit;

providing the pit contractor group of the plurality of groups with limited write access to the central body of information during a second time;

receiving information from the pit contractor during the second time into the central body of information in real time regarding completion of opening the pit;

providing a technician group of the plurality of groups with unlimited read access to the central body of information during a first time;

receiving by the technician group during the first time information from the technician manager group in real time from the central body of information regarding performing the cable task within the pit;

providing the technician group with limited and indirect access through the first group to the central body of information to place information into the central body of information during a second time;

receiving information from the technician group during the second time into the central body of information in real time regarding completion of the cable task;

executing the cable task;

providing a fourth group of the plurality of groups with limited write access to the central body of information a first time;

receiving information into the central body in real time from the fourth group during the first time;

providing the pit contractor group of the plurality of groups with unlimited read access to the central body of information during a third time;

receiving by the pit contractor group during the third time via the central body of information that information from the fourth group of the plurality of groups in real time; and providing the pit contractor group of the plurality of groups with limited write access to the central body of information a fourth time;

receiving information from the pit contractor group during the fourth time into the central body of information in real time, where the body of information received during the fourth time comprises at least, the time a pit was opened, the time the pit was closed, the location of the pit, reports that the pit is unsafe, reports about disputes arising from the pit's existence, the time period from a request to open a pit to its opening and the time from a request to close a pit to its closing;

executing closing of the pit.

10. A method for managing a plurality of internal and external groups responsible for pit activities, the method comprising the steps of:

providing the plurality of internal groups comprising a technician manager group with a first access to a central body of information a first time;

receiving from the technician manager group during the first time a first information regarding opening of a pit into the central body of information, wherein the first access comprises unlimited read access and limited write access;

executing the step of opening the pit;

providing the plurality of external groups comprising a pit contractor with a second access to the central body of information;

receiving by the pit contractor the first information from the central body of information;

receiving from the pit contractor a second information regarding completion of closing the pit into the central body of information, wherein the second access comprises unlimited read access and limited write access; and providing the plurality of internal groups comprising the technician manager group with the first access to the central body of information a second time;

receiving by the technician manager group the second information from the central body of information during the second time; and executing the closing of the pit.

11. The method of claim 10, wherein the first access is provided through an intranet.

12. The method of claim 11, wherein the second access is provided through a
global internet.

13. The method of claim 10, wherein the first information is a command
directed to one or more of the plurality of external groups.

14. The method of claim 13, wherein the second information responds to the
first information.

15. The method of 14, wherein the central body of information is a computer
network application designed to be accessed through a global internet.

* * * * *